United States Patent [19]
Johnson

[11] Patent Number: 4,756,416
[45] Date of Patent: Jul. 12, 1988

[54] KNOCK-DOWN CARRIER FOR ATHLETIC EQUIPMENT OR THE LIKE

[76] Inventor: Alan L. Johnson, 705 Catalina Ave., Seal Beach, Calif. 90740

[21] Appl. No.: 31,775

[22] Filed: Mar. 30, 1987

[51] Int. Cl.$^4$ .............................................. B65D 85/68
[52] U.S. Cl. .................................. 206/335; 206/577; 190/107; 150/52 K
[58] Field of Search ............. 206/335, 577; 150/52 K; 217/37, 38; 190/107; 224/42.03 B

[56] References Cited

U.S. PATENT DOCUMENTS 3,886,988  6/1975  Garrett et al. .................. 206/335 X
4,390,088  6/1983  Brenner ............................ 206/335

OTHER PUBLICATIONS

"Bicycle Guide", Feb. 1987, pp. 60 and 61.

Primary Examiner—William Price
Attorney, Agent, or Firm—Bernard L. Kleinke

[57] ABSTRACT

A knock-down collapsible carrier for storing and transporting athletic equipment such as a bicycle or the like. The carrier comprises a hollow housing unit, shaped and dimensioned in a tri-dimensional box-like structure, adopted to contain a partially dismantled bicycle. The housing unit includes a front wall, a rear wall, two side walls, and a top member, each of which comprises a pair of light-weight layers of flexible composition, for removably housing a plurality of resilient rigidifying inserts. The carrier further comprises a plurality of strap bands for retaining the bicycle inside the housing unit, leaving a clearance space therebetween.

17 Claims, 2 Drawing Sheets

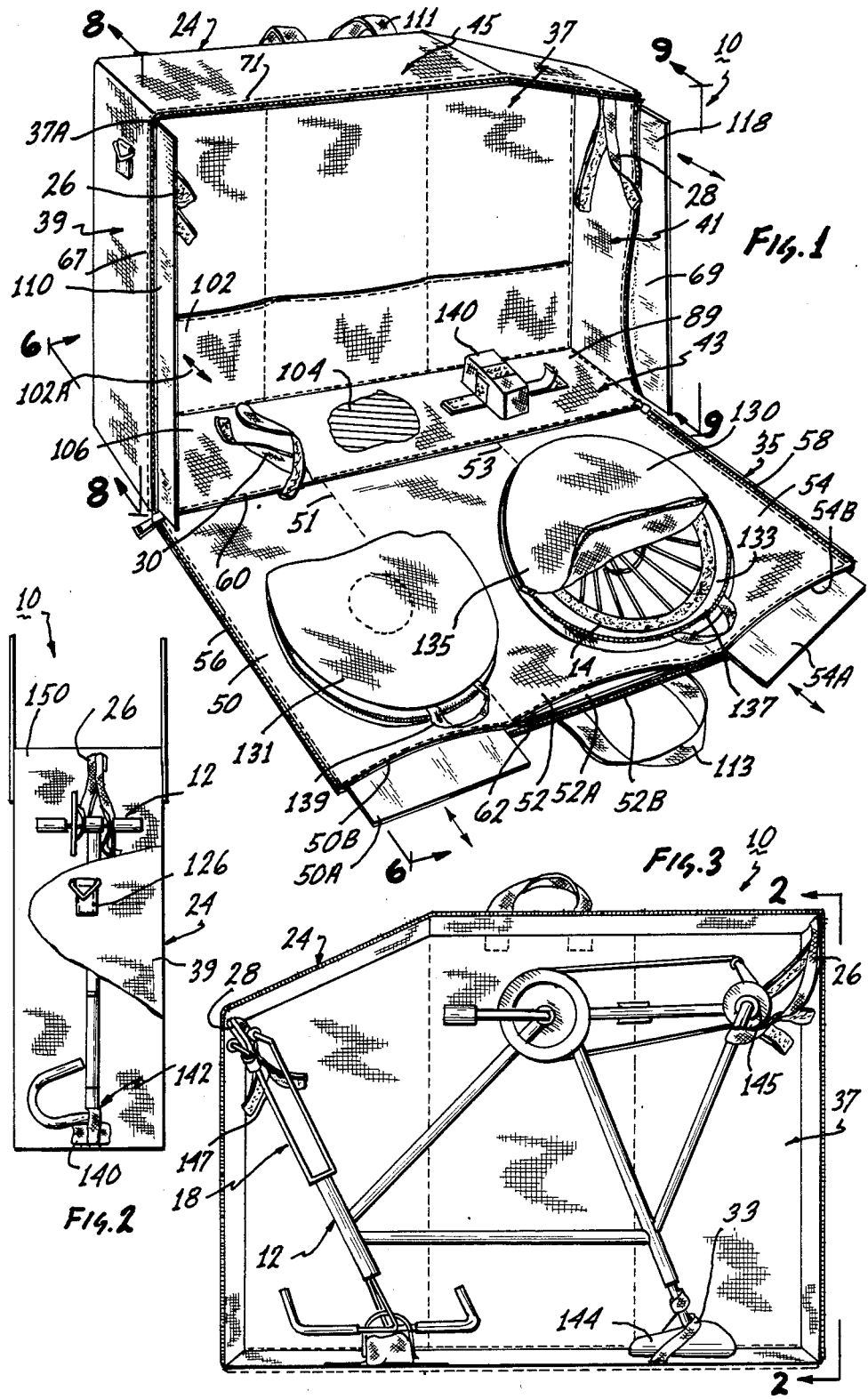

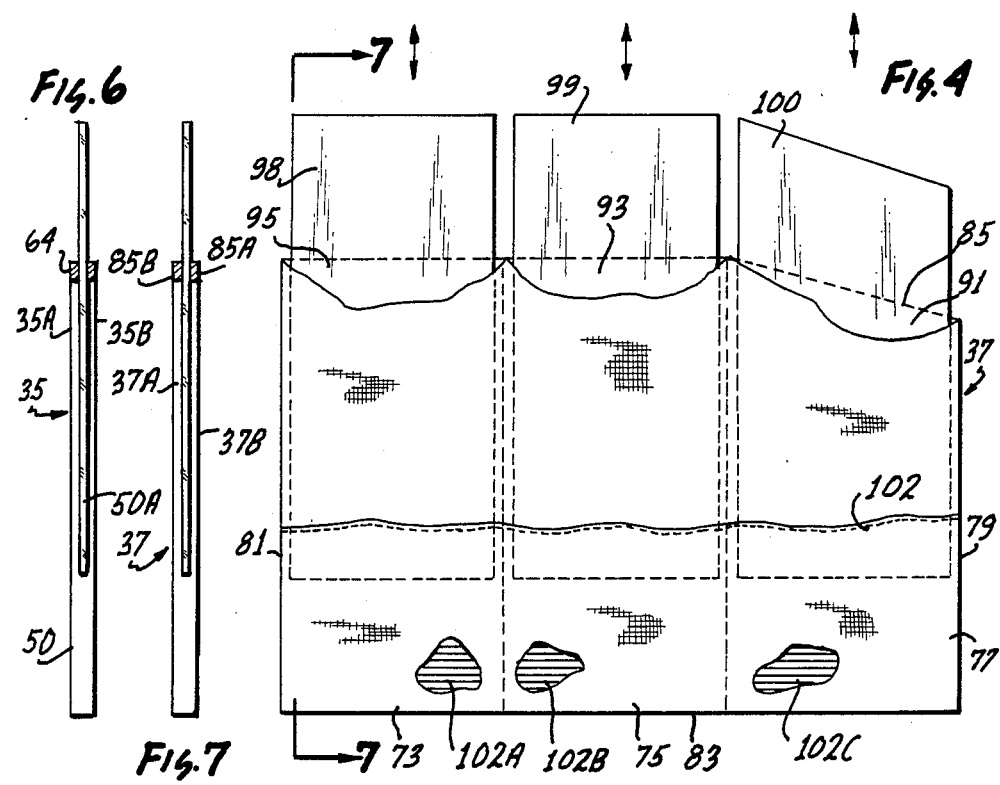
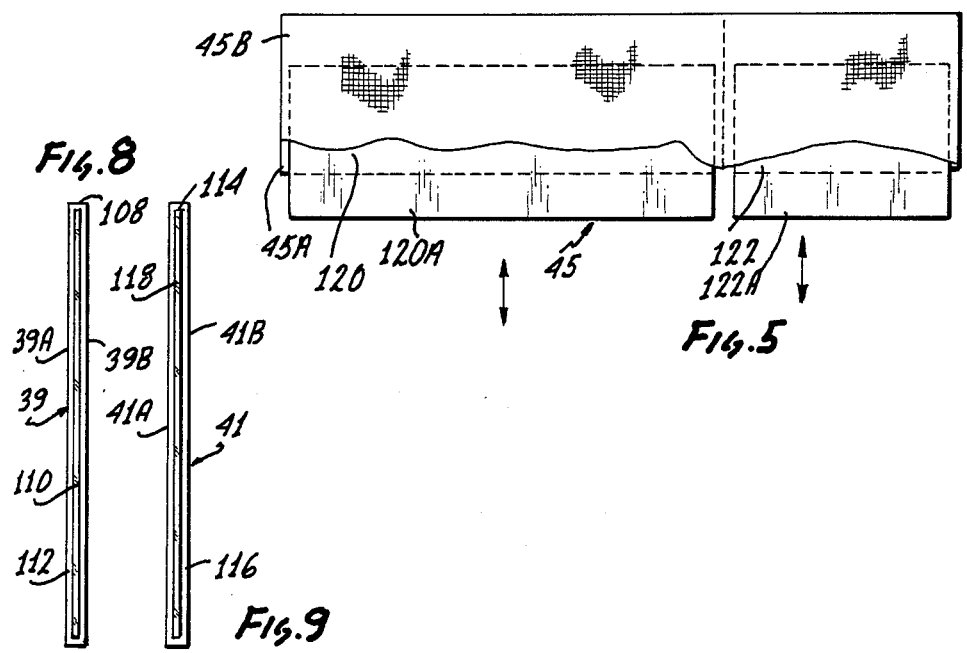

KNOCK-DOWN CARRIER FOR ATHLETIC EQUIPMENT OR THE LIKE

TECHNICAL FIELD

The present invention relates in general to the field of storage cases, and it more particularly relates to knock-down carriers for heavy items, such as bicycles or the like.

BACKGROUND ART

There exists a wide variety of cases for storing athletic equipment, and more particularly bicycles. Some of these cases come in the shape of a rectangular or cubical box, which contains the parts of a dismantled bicycle. However, such cases do not offer the requisite durability or protection to support the stored item. In order to provide the required protection, existing cases use foam pads, or shock absorbent material, which render them too rigid to be collapsed into smaller easily storable packages.

The present field is best illustrated by the following U.S. Pat. Nos. 2,329,088; 2,379,994; 2,828,062; 2,828,063; 2,838,356; 4,411,461; 4,450,581; 4,497,630; 4,503,955; 4,510,982; 4,514,876; 4,516,668; 4,519,318; 4,521,045; 4,527,688; 4,561,706; 4,561,525; 4,546,877; 4,552,270.

It could be clearly seen from the relevant art that all present attempts to combine the features of sufficient rigidity to protect valuable items stored inside, collapsibility into smaller packages, and light-weightedness for easier transportation, have fallen through. Thus, it would be highly desirable to have a new and improved knock-down carrier which addresses the above concerns of the prior art, which is relatively simple and inexpensive to manufacture, which is easily assembled and disassembled, and which is further aesthetically pleasant.

DISCLOSURE OF THE INVENTION

Therefore, the principal object of the present invention is to provide a new and improved knock-down carrier, for housing athletic equipment such as bicycles, of different sizes.

It is yet another object of the present invention to provide a carrier which is rigid, light weight and relatively inexpensive.

Briefly, the above and further objects and features of the present invention are realized by providing:

A knock-down collapsible carrier for storing and transporting athletic equipment such as a bicycle or the like. The carrier comprises a hollow housing unit, shaped and dimensioned in a tri-dimensional box-like structure adapted to contain a partially dismantled bicycle. The housing unit includes a front wall, a rear wall, two side walls, and a top member, each of which comprises a pair of light-weight layers of flexible composition, for removably housing a plurality of resilient rigidifying inserts. The carrier further comprises a plurality of strap bands for retaining the bicycle inside the housing unit, leaving a clearance space therebetween.

BRIEF DESCRIPTION OF DRAWINGS:

The above mentioned and other objects and features of this invention and the manner of attaining them will become apparent, and the invention itself will be best understood by reference to the following description of the embodiment of the invention in conjunction with the accompanying drawings, wherein:

FIG. 1 is a perspective view of a knock-down carrier constructed in accordance with the present invention, showing two wheel bags housing the two dismantled wheels;

FIG. 2 is a cross sectional side elevational view of the carrier of FIG. 1, taken on line 2—2 of FIG. 3;

FIG. 3 is a pictorial front elevational fragmentary view of the carrier of FIG. 1, shown housing a dismantled bicycle;

FIG. 4 is a diagramatic front elevational view of the rear wall of the carrier of FIG. 1;

FIG. 5 is a diagramatic front view of the top member of the carrier of FIG. 1;

FIG. 6 is cross-sectional side view of the front wall, taken on line 6—6 of FIG.1;

FIG. 7 is a cross-sectional side view of the rear wall, taken on line 7—7 of FIG. 4;

FIG. 8 is a cross-sectional side view of the first side wall, taken on line 8—8 of FIG. 1; and FIG. 9 is a cross-sectional side view of the second side wall, taken on line 9—9 of FIG. 1.

BEST METHOD FOR CARRYING OUT THE INVENTION

Referring now to the drawings, and more particularly to FIGS. 1, 2 and 3, there is illustrated a knock-down carrier 10 for athletic equipment or the like, which is constructed in accordance with the present invention.

The carrier 10 is illustrated housing a partly disassembled bicycle 12, in preparation for storage or transportation. The bicycle 12 is shown mounted in an upside down position, inside the carrier 10, and away from its lateral walls. When in use, the carrier 10 provides for a minimum dismantling of the bicycle 12. As best shown in FIGS. 1 and 3, only the wheels, such as the wheel 14, the chain and the rear derailleur (not shown) need be disassembled and stored separately from the frame 18.

The carrier 10 is illustrated in FIGS. 1 and 3, and generally comprises a hollow housing unit 24, which is shaped in a tri-dimensional box-like structure and adapted for storing and transporting generally heavy athletic equipment or the like. Four strap bands 26, 28, 30 and 33 are attached to the inside of the housing unit 24, at predetermined locations therein, for releasably, and tightly securing the bicycle 12 to the inside of the housing unit 24, and at a distance from its lateral walls.

As illustrated in FIG. 1, the housing unit 24 further comprises one front wall 35, a rear wall 37, two side walls 39 and 41, a bottom member 43, and a top member 45, each of which, with the optional exception of the bottom member 43, is generally made of two superposed layers of suitable flexible, pliable and light-weight material, such as plastic, Nylon, leather or fabric, for giving the carrier 10 a generally flexible structure, and light weight composition. Each one of the above constituent parts of the carrier 10, will now be described in greater detail with respect to FIGS. 1 and 4–9.

Considering now the front wall 35 with respect to FIGS. 1 and 6, it generally comprises two like oppositely disposed, substantially layers 35A and 35B, having a flexible composition, and a generally rectangular shape. The layers 35A and 35B are specifically and particularly seamed and secured together, so as to define a plurality of compartments, such as the compartments 50, 52, and 54, for receiving individual flat rigidifying inserts or panels, such as the panels 50A, 52A and 54A.

In this regard, the compartments 50 and 52 are adjacently disposed along a coextensive longitudinal edge portion 51. The compartments 52 and 54 are similarly disposed along an edge portion 53, which is generally parallel to the edge portion 51. The compartments 50 and 52 are generally rectangularly and equally shaped and dimensioned, and fully house the two rigidifying panels 50A and 52A respectively. The compartment 54 is generally trapezoidally shaped, and fully house the rigidifying insert or panel 54A, of generally similar shape and dimensions thereto.

The front wall 35 is bordered by two generally rectilinear parallel side edges or end portions 56 and 58; a lower generally rectilinear edge 60; and an upper edge 62. The end portion 58 is shorter than the opposite end portion 56. The upper edge 62 comprises three integral, longitudinal lip portions or apertures 50B, 52B and 54B for receiving the rigidifying inserts 50A, 52A and 54A respectively. The apertures 50B and 52B are colinearly disposed, while the aperture 54B slopingly, integrally depends from the central aperture or lip portion 52B.

The apertures 50B, 52B and 54B are sealingly releasably closed with a closure device 64, such as with a zipper or adhesive straps sold under the trade name Velcro. The rigidifying inserts 50A, 52A and 54A are completely slidingly fitted inside the compartments 50, 52, and 54 respectively, and the closure device 64 fastened to fully contain the insert therein. The lower edge 60 is hingedly secured to the coinciding longitudinal edge 66 of the bottom member 43. The end portions 56 and 58, and the upper edge 62 are releasably secured to the corresponding edges 67, 69 and 71 of the side walls 39 and 41, and the top member 45 respectively (FIG. 3), by means of a closure device, such as a zipper.

Considering now the rear wall 37, in greater detail, with respect to FIGS. 3, 4 and 7, it is substantially similarly dimensioned and composed as the front wall 35. It generally comprises an inner and an outer superposing layers 37A and 37B which are seamed and secured to form three compartments 73, 75 and 77, substantially similar in design and dimensions, to the compartments 50, 52 and 54 respectively. The rear wall 37 is bordered by two generally rectilinear, parallel side edges 79 and 81; a lower generally rectilinear edge 83; and an upper edge 85.

The two side edges 79 and 81 are fixedly secured to the corresponding edges of the side walls 41 and 39 respectively. Similarly, the lower edge 83 is fixedly secured to the longitudinal edge 89 of the bottom member 43. The upper edge 85 generally forms three apertures 91, 93 and 95, which correspond to the compartments 77, 75 and 73 respectively, and which are designed to slidingly receive and to house three rigidifying inserts or panels 98, 99 and 100. The panels 98, 99 and 100 are substantially similar to the panels 50A 52A and 54A respectively, and are similarly slidingly fitted and housed inside the compartment 73, 75 and 77 .

The upper edge 85 is attached to the upper member 45, along the corresponding lip 85A of the outer layer 37B. The other lip 85B of the inner layer 37A is kept free, to enable access to the inside of the compartments 77, 75 and 73. Once the rigidifying inserts, 98, 99 and 100, are housed inside their respective compartments 73, 75 and 77, the lip 85B is releasably fastened to the opposing end 85A.

The rear wall 37 further comprises a third layer 102 of generally similar composition to the layers 37A and 37B, which is secured to the inner layer 37A, to form three storage pockets 102A, 102B and 102C.

Considering now the bottom part 43 in greater detail, it comprises a generally rectangular blank 104 of a suitable composition, which is secured to an inner layer 106. Turning now to the side walls 39 and 41, they are similarly designed and are generally rectangularly shaped with the optional exception of the side wall 41 having smaller dimensions than the side wall 39. FIGS. 1 and 8 illustrate the side wall 39 as comprising two superposed layers 39A and 39B, which form a compartment 108, for receiving a generally rectangular panel 110. The compartment 108 has a longitudinal aperture 112 which is releasably closed when the panel 110 is inserted therein.

Similarly, FIGS. 1 and 9 illustrate the side wall 41 as comprising two superposed layers 41A and 41B, which form a compartment 114, having a longitudinal aperture 116, for receiving a rigidifying insert panel 118, which is generally rectangularly shaped. The aperture 116 is releasably closed when the panel 118 is fully inserted inside the compartment 114.

FIGS. 1 and 5 illustrate the top member 45 as comprising two superposed layers 45A and 45B, which form two generally rectangular compartments, 120 and 122, for housing two similarly dimensioned rigidifying panels or inserts 120A and 122A, in a similar manner as described above.

Considering now the composition and design of the above rigidifying inserts or panels, such as the inserts 110 and 118, they are made of a hard thin, light-weight, flexible and resilient material, such as plastic. he panels 50A, 52A, 98 and 99 are generally rectangularly shaped and similarly dimensioned. The panels 54A and 100 are generally similarly shaped to one another, and have the same width as the panel 50A. The panels 110 and 118 are of equal width, which is different and generally smaller than the width of the panel 50A. The panels 120A and 122A have smaller lengths than those of the other panels, but have equal widths to those of the panels 110 and 118.

So dimensioned, the panels are easily identifiable for a quicker assembly of the carrier 10. A pair of handles 111 and 113 are advantageously provided, and oppositely disposed on the front and rear walls 35 and 37. Another pair of hooks such as the hook 126 (other hook not shown) are oppositely secured to the side walls 39 and 41, for attachment to an optional shoulder strap (not shown).

Turning now to FIGS. 1, 2 and 3, and considering the inventive disposition of a bicycle 12 within the carrier 10. The two wheels, such as the wheel 14, the chain and the rear derailleur (not shown) are first dismantled from the frame 18. The wheels, such as the wheel 14, are then stored in separate, generally identical circularly shaped bags 130 and 131. Each of these bags, for instance the bag 130, comprises a pair of oppositely disposed layers 133 and 135, of a light-weight and flexible composition, generally similar to that of the layers, such as the layers 35A and 35B, of the housing unit 24.

The two layers 133 and 135 are fixedly secured to one another along about 180 degrees of their respective peripheries. The wheel 14 is first inserted inside the bag 130, and the bag 130 is then releasedly secured along its remaining periphery by means of a conventional closure device, such as a zipper 137. Each bag, such as the bag 131, is secured with a handle 139 for convenient transportation. The bags 130 and 131 are stored inside the carrier 10, as shown in FIG. 1, in proximity to the frame 18. The bags, such as the bag 130, could also be secured to the inside of the carrier 10, by strapping the handle 139 to either band 26 or 28.

Four flaps or strap bands 26, 28, 30 and 33 are provided inside the carrier 10 to tightly and releasably secure the frame 18 therein, and away from its walls 35, 37, 39 and 41. A resilient shock absorbent pad 140 is releasably secured to the bottom member 43 along the strap 33. The pad 140 supports the stem or handlebar 142, and the strap 33 is fastened therearound. Another seat post strap 30 is secured at a predetermined position, to the bottom member 43, so as to be fastened around the seat 144. Thus disposed, the frame 18 is secured from transportation shocks, since the pad 140 elevates and supports the stem 142 and the front part of the frame 18, and the self-cushioned seat 144, provides support for the rest of the frame 18.

The pad 140 is adjustably secured along the length of the longitudinal strap band 33, in order to accomodate bicycles of different sizes. Another strap 26 is secured to the inside layer 39A of the side wall 39, to retain the chainstays 145 and optionally the wheel bags 130 or 131. The strap 28 is similarly secured to the inside layer 41A of the side wall 41, to retain the front fork 147, and optionally the wheel bags 130 and 131. Thus retained inside the carrier 10, the frame 18, is shown in FIG. 2 as being securely stored inside the carrier 10, at a distance from the front and rear walls 35 and 37, in order to isolate the frame from external undesired or accidental shocks. Thus, the clearance space 150 between the frame 18, and the inside of the carrier 10 is essential for safe transportation of the bicycle 12.

It could also be noted that since the pedals, cranks and chainring of the bicycle do not have to be dismantled, the process or storing the bicycle 12 inside the carrier 10 is relatively simple and substantially non time consuming.

When the carrier 10 is to be collapsed or stored, the rigidifying inserts are slid out of their respective compartments, and stacked atop the bottom member 43, inside the carrier 10. Thus, the size of the carrier 10 is substantially reduced for easy storage.

As illustrated in FIGS. 2 and 3, the handle bar 142 is rotated around its axis, when stored, so as to reduce the clearance space 150, between the frame 18, and the inside of the carrier 10, when the bicycle 12 is stored inside the carrier 10. Thus, this rotation of the handle bar 142, reduces the overall width of the carrier 10, and makes it easier and more convenient to carry.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A knock-down collapsible carrier for storing and transporting athletic equipment, such as a bicycle having a seat, handlebars and a pair of wheels, comprising:
    A hollow housing unit, being shaped and dimensioned in a tri-dimensional box-like structure, adapted to contain the partially dismantled bicycle;
    means for retaining the dismantled bicycle inside said housing unit, leaving a clearance space therebetween;
    means for releasably closing housing unit;
    said housing unit including a front wall, a rear wall, two side walls, and a top member, each of which having a pair of substantially similar, light-weight superposed layers, of flexible pliable composition and removably housing rigidifying means;
    said housing unit further comprising a rigidified, generally light-weight bottom member;
    said bottom member being wider than the bicycle to be stored within said housing unit;
    said means for retaining including bicycle seat retaining means fixed to the inside of said bottom member for securing the bicycle seat in engagement with a central portion of the inside surface of said bottom member;
    said means for retaining further including resilient pad means mounted on said central portion of the inside surface of said bottom member spaced a predetermined distance from said seat retaining means for supporting from below the bicycle handlebars;
    means for securing the bicycle wheels to at least one of said walls; and
    whereby the bicycle is supported within said housing unit in an inverted manner with only its wheels being disassembled.

2. A carrier according to claim 1, wherein said retention means comprises a plurality of strap bands.

3. A carrier according to claim 2, wherein said rigidifying means comprises a plurality of flat panels of a rigid, resilient composition.

4. A carrier according to claim 3, wherein said closure means comprises a zipper.

5. A carrier according to claim 3, wherein said front wall comprises a plurality of compartments for removably housing an equal number of rigidifying panels.

6. A carrier according to claim 5, wherein said rear wall comprises a plurality of compartments for removably housing an equal number of rigidifying panels.

7. A carrier according to claim 6, wherein said top member comprises a plurality of compartments for removably housing an equal number of rigidifying panels.

8. A carrier according to claim 7, wherein each of said side walls comprises at least one compartment for removably housing an equal number of rigidifying panels.

9. A carrier according to claim 8, wherein:
    said front walls comprises three compartments;
    said rear wall comprises three compartment of generally equal dimensions to those of said front walls;
    said top member comprises two compartments of different dimensions than those of said front walls; and
    said compartments of said side walls have different dimensions than those of said front walls for easier identification and quicker assembly of said housing unit.

10. A carrier according to claim 9, wherein each of said compartments fully house one rigidifying panel; and
    wherein each of said compartments comprises a closure means for preventing slippage of said rigidifying panels.

11. A carrier according to claim 10, wherein:
    said front walls comprises two generally similar rectangular flat panels, and a generally trapezoidally shaped flat panel; and each of said top member, and side walls comprises at least a generally rectangularly shaped flat rigidifying panel.

12. A carrier according to claim 1, further including means for attaching said pad removably to said bottom member to enable it to be adjusted positionally relative to said seat retaining means for accommodating different bicycles.

13. A knock-down collapsible carrier for storing and transporting athletic equipment, such as a bicycle, comprising:

a hollow housing unit, being shaped and dimensioned in a tri-dimensional box-like structure, adapted to contain the partially dismantled bicycle;

means for retaining the dismantled bicycle inside said housing unit, leaving a clearance space therebetween;

means for releasably closing said housing unit;

said housing unit including a front wall, a rear wall, two side walls, and a top member, each of which having a pair of substantially similar, light-weight superposed layers, of flexible pliable composition and removably housing rigidifying means;

said housing unit further comprising a rigidified, generally light-weight bottom member;

wherein said retention means comprises a plurality of strap bands;

wherein said rigidifying means comprises a plurality of flat panels of a rigid, resilient composition;

wherein said front wall comprises a plurality of compartments for removably housing an equal number of rigidifying panels;

wherein said rear wall comprises a plurality of compartments for removably housing an equal number of rigidifying panels;

wherein said top member comprises a plurality of compartments for removably housing an equal number of rigidifying panels;

wherein each of said side walls comprises at least one compartment for removably housing an equal number of rigidifying panels;

said front walls comprising three compartments;

said rear wall comprising three compartments of generally equal dimensions to those of said front walls;

said top member comprising two compartments of different dimensions than those of said front walls;

said compartments of said side walls have different dimensions than those of said front walls for easier identification and quicker assembly of said housing unit;

wherein each of said compartments fully house one rigidifying panel;

wherein each of said compartments comprises a closure means for preventing slippage of said rigidifying panels;

said front walls comprising two generally similar rectangular flat panels, and a generally trapezoidally shaped flat panel;

each of said top member, and side walls comprises at least a generally rectangularly shaped flat rigidifying panel;

one of said strap bands is secured to said bottom member; and wherein said housing unit further comprises a shock absorbent pad, being adjustably secured along said strap band of said bottom member, for supporting the handlebars of the bicycle.

14. A carrier according to claim 13, further comprising a pair of circularly shaped wheel bags, for receiving and storing the dismantled wheels.

15. A method of using the carrier of claim 14, comprising the steps of:

assembling said housing unit by inserting said rigidifying panels in their corresponding compartments;

placing the partly disassembled bicycle inside said housing unit, and causing it to rest on its seat;

strapping various pre-determined parts of the bicycle with said strap bands; and closing said housing unit with said closure means.

16. A method according to claim 15, further comprising the step of dismantling the carrier by removing the rigidifying panels from their respective compartments, and storing said panels inside said housing unit.

17. A method according to claim 15, further comprising storing the wheels in said wheel bags, and releasably strapping said wheel bags to the inside of said housing unit.

* * * * *

UNITED STATES PATENT AND TRADEMARK OFFICE
CERTIFICATE OF CORRECTION

PATENT NO. : 4,756,416

DATED : Jul. 12, 1988

INVENTOR(S) : Alan L. Johnson

It is certified that error appears in the above-identified patent and that said Letters Patent is hereby corrected as shown below:

Column 4, Line 34, After "plastic.", please delete "he", and substitute therefor -- The --.

Column 6, Line 1, After "closing", please insert -- said --.

Signed and Sealed this

Thirty-first Day of January, 1989

Attest:

DONALD J. QUIGG

Attesting Officer

Commissioner of Patents and Trademarks